United States Patent
Im et al.

(10) Patent No.: US 7,379,276 B2
(45) Date of Patent: May 27, 2008

(54) MAGNETIC RECORDING HEAD HAVING A PLURALITY OF SHIELD LAYERS

(75) Inventors: Young-hun Im, Suwon-si (KR); Yong-su Kim, Seoul (KR)

(73) Assignees: Samsung Electronics Co., Ltd., Suwon-si (KR); Institute for Information Technology Advancement, Daejeon (KR)

( * ) Notice: Subject to any disclaimer, the term of this patent is extended or adjusted under 35 U.S.C. 154(b) by 253 days.

(21) Appl. No.: 10/943,232

(22) Filed: Sep. 17, 2004

(65) Prior Publication Data

US 2005/0105214 A1    May 19, 2005

(30) Foreign Application Priority Data

Sep. 19, 2003    (KR) .................. 10-2003-0065223

(51) Int. Cl.
*G11B 5/39* (2006.01)
*G11B 5/147* (2006.01)
(52) U.S. Cl. .................. 360/319; 360/126; 360/317
(58) Field of Classification Search ................ 360/317, 360/319, 125–126
See application file for complete search history.

(56) References Cited

U.S. PATENT DOCUMENTS 6,292,334 B1 * 9/2001 Koike et al. ............... 360/319
6,430,009 B1 * 8/2002 Komaki et al. ............. 360/319
6,477,008 B1   11/2002 Chang et al.
7,019,943 B2 * 3/2006 Sato .......................... 360/126
7,031,119 B2 * 4/2006 Watanabe et al. .......... 360/313
7,145,750 B2 * 12/2006 Kimura et al. ............. 360/126

FOREIGN PATENT DOCUMENTS

JP    2004-326990 A    11/2004
KR    2002-0041578     6/2002

OTHER PUBLICATIONS

Notice to Submit Response of the Korean Intellectual Property Office dated Oct. 31, 2005.

* cited by examiner

*Primary Examiner*—A. J. Heinz
(74) *Attorney, Agent, or Firm*—Sughrue Mion, PLLC

(57) ABSTRACT

Provided is a magnetic recording head including a return pole, a writing pole spaced by a predetermined distance from the return pole, an induction writing coil for inducing a magnetic field to be formed across the writing pole, and a plurality of shield layers formed on the writing pole. Accordingly, magnetic fields generated inside and outside the magnetic recording head are prevented from concentrating on the return pole, and information is effectively written on and erased from an information recording media.

5 Claims, 6 Drawing Sheets

MAGNETIC RECORDING HEAD HAVING A PLURALITY OF SHIELD LAYERS

BACKGROUND OF THE INVENTION

This application claims the priority of Korean Patent Application No. 2003-65223, filed on Sep. 19, 2003, in the Korean Intellectual Property Office, the disclosure of which is incorporated herein in its entirety by reference.

1. Field of the Invention

The present invention relates to a magnetic recording head, and more particularly, to a magnetic recording head, which includes a plurality of shield layers formed on a writing pole to prevent magnetic fields generated inside and outside the magnetic recording head from concentrating on a return pole and to effectively write and erase information on an information recording media.

2. Description of the Related Art

Studies of a perpendicular magnetic recording method are actively performed all over the world to increase a recording density in a magnetic information recording field. In the perpendicular magnetic recording method, magnetization is oriented perpendicular to a disk surface to increase a recording density, unlike a general longitudinal magnetic recording method. The perpendicular magnetic recording method writes information using a writing pole.

FIG. 1 is a perspective view of a conventional magnetic read/write head in an apparatus for writing and reading a magnetic signal on a predetermined recording media, such as a hard disk drive (HDD). As shown in FIG. 1, a magnetic head 10 is installed on a slide 12 disposed on one end of a swing arm 11, and is moved to a desired position over a recording media by pivoting of the swing arm 11 to perform write and read operations.

FIG. 2 is an enlarged view of the magnetic head 20 shown in FIG. 1. As shown in FIG. 2, the magnetic head 20 includes a magneto-resistive head 21 for a read operation and a magnetic recording head for a write operation. The magneto-resistive head 21 detects and reads a magnetic signal recorded on the recording media. The magnetic recording head includes a writing pole 22 for forming leakage magnetic flux to the recording medium, a return pole 23, and a writing coil 24 acting as a current supply route, and records a magnetic signal of a desired content on the recording media.

In particular, the magnetic recording head determines the quality of a signal input to the recording media. If the signal input via the magnetic recording head is not clean, the magneto-resistive head cannot perform satisfactory reproduction although it has an excellent performance. The magnetic recording head is very sensitive to an external magnetic field. For example, a magnetic field from a voice coil motor (VCM) that drives the swing arm 11 is introduced to the magnetic recording head, an undesired external magnetic field concentrates on the magnetic recording head. This phenomenon is referred to as an antenna effect. The external magnetic field concentrating on the magnetic recording head causes wrong information to be written on the recording media or information on the recording media to be erased.

FIG. 3A illustrates the flow of a magnetic field when information is written on an information recording media, such as a HDD, using a magnetic recording head.

A conventional magnetic recording head 30 includes a return pole 32, a writing pole 33 spaced by a predetermined distance from the return pole 32, an induction writing coil 34 for forming a magnetic field across the writing pole 33, and a shield layer 35 formed on the writing pole 33. The writing pole 33 writes information on an information recording media 31 that is generally formed by depositing a writing layer on a soft magnetic layer. As shown in FIG. 3A, a magnetic field that moves from the writing pole 33 and passes through the return pole 32 and the shield layer 35 forms an oval shape. If a magnetic field passing through the return pole 32 in a magnetic recording head without the shield layer 35 becomes larger, the magnetic field causes a noise to the recording media. To prevent the noise, the shield layer 35 is formed on the writing pole 33 so that part of the magnetic field flowing toward the return pole 32 can be distributed to the shield layer 35, and thus, the strength of the magnetic field directed toward the return pole 32 can be reduced.

When magnetic writing is performed, magnetic flux from the writing pole 33 separately flows to the return pole 32 and the shield layer 35. Here, since the return pole 32 is not magnetically connected to the writing pole 33, the magnetic flux flowing toward the return pole 32 decreases relatively, and the magnetic flux flowing toward the shield layer 35 increases. If a large amount of magnetic flux flows to the shield layer 35, the large amount of magnetic flux causes a noise that obstructs writing, thereby reducing the effect of the shield layer 35.

FIG. 3B illustrates the flow of a magnetic field generated by an external magnetic field source, such as the swing arm or the VCM for driving the swing arm, other than the magnetic recording head 30. The magnetic flux concentrates on an end of the writing pole 33 due to structural characteristics of the writing pole 33 and a large amount of magnetic flux flows through the writing pole 33. The large amount of magnetic flux causes a noise when the information recording media 31 performs writing. The shield layer 35 is employed to reduce the influence of the external magnetic field.

However, the shield layer 35 formed on the writing pole 33 has a limitation in reducing the adverse effects of the magnetic fields generated inside and outside the magnetic recording head 30 as shown in FIG. 3A and FIG. 3B, respectively. That is, the shield layer 35 hardly reduces the influence of the external magnetic field on the writing pole 33, such that the external magnetic field affects and still obstructs the writing function of the writing pole 33. Although the external magnetic field generated outside the magnetic recording head 30 is small, the external magnetic field at the writing pole 33 becomes larger sharply due to a bottleneck.

SUMMARY OF THE INVENTION

The present invention provides a magnetic recording head, which disperses magnetic flux that flows to a single-layer shield portion during a perpendicular magnetic recording process to reduce a magnetic field that causes a noise of a recording media at the single-layer shield portion.

The present invention also provides a magnetic recording head, which disperses an external magnetic field that flows to a writing pole to prevent the external magnetic field from concentrating on the writing pole and obstructing information writing.

According to an aspect of the present invention, there is provided a magnetic recording head comprising: a return pole; a writing pole spaced by a predetermined distance from the return pole; an induction writing coil for inducing a magnetic field to be formed across the writing pole; and a plurality of shield layers formed on the writing pole.

The plurality of shield layers may be made of a magnetic material, and each insulation layer may be formed between adjacent shield layers of the plurality of shield layers to separate the adjacent shield layers.

Among the plurality of shield layers, a magnetic permeability of a lower shield layer may be less than or equal to a magnetic permeability of an upper shield layer.

Among the plurality of shield layers, a width of a leading end of a lower shield layer may be less than or equal to a width of a leading end of an upper shield layer.

Leading ends of the plurality of shield layers may be aligned with a leading end of the writing pole.

The insulation layer formed between the adjacent shield layers may extend from leading ends of the adjacent shield layers to predetermined portions of tailing ends of the adjacent shield layers.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

The present invention will now be described more fully with reference to the accompanying drawings, in which preferred embodiments of the invention are shown.

Figure 1:
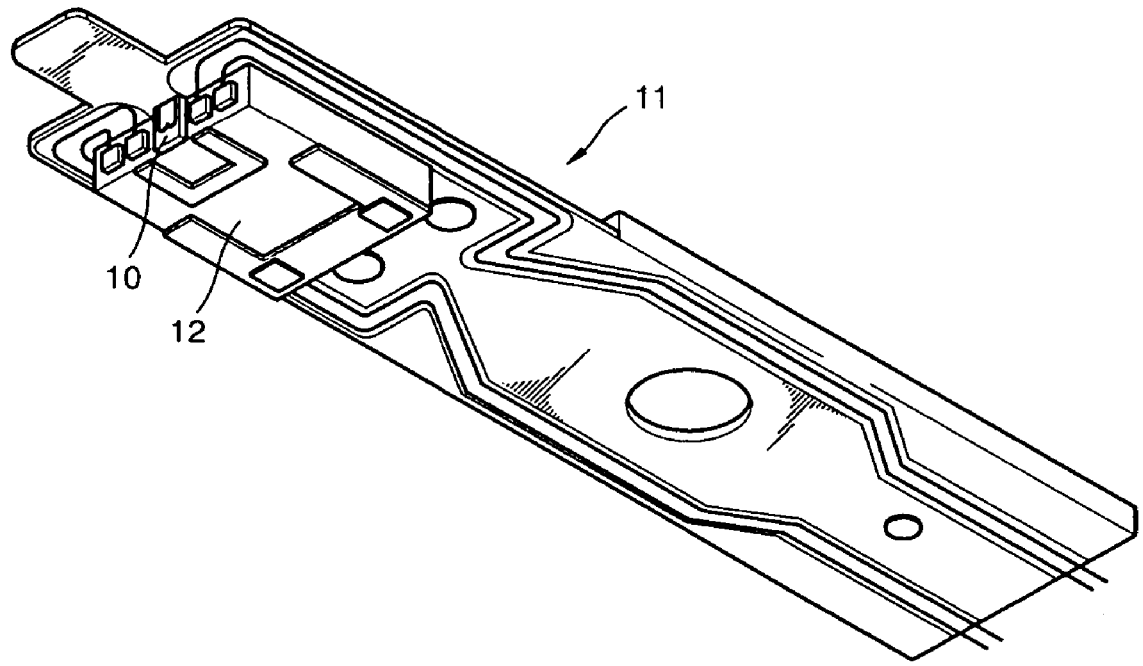
FIG. 1 is a perspective view of a conventional magnetic read/write head in an apparatus for writing and reading a magnetic signal on an information recording media.
Figure 2:
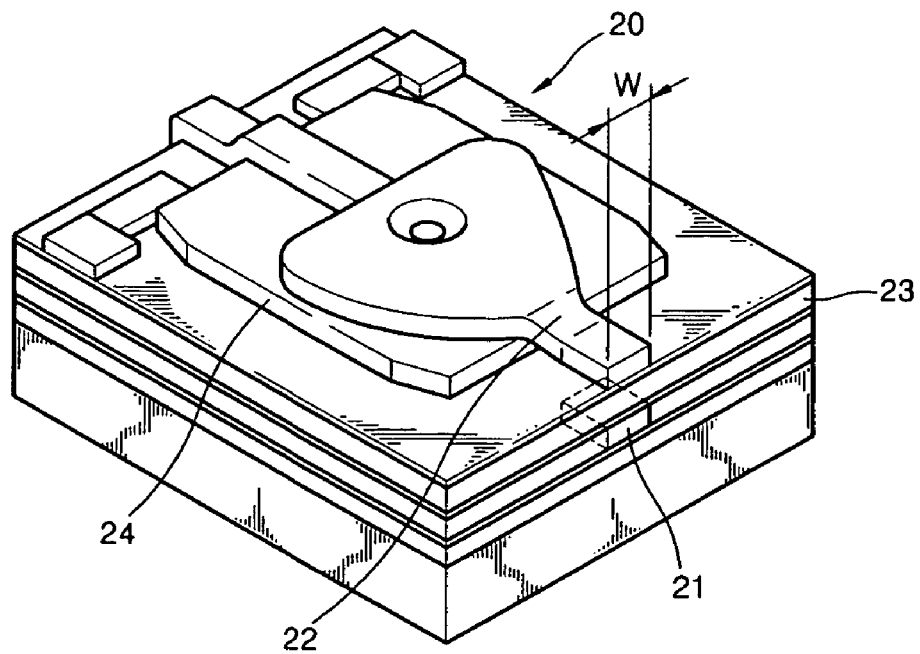
FIG. 2 is a schematic perspective view of the magnetic head shown in FIG. 1.
Figure 3A:
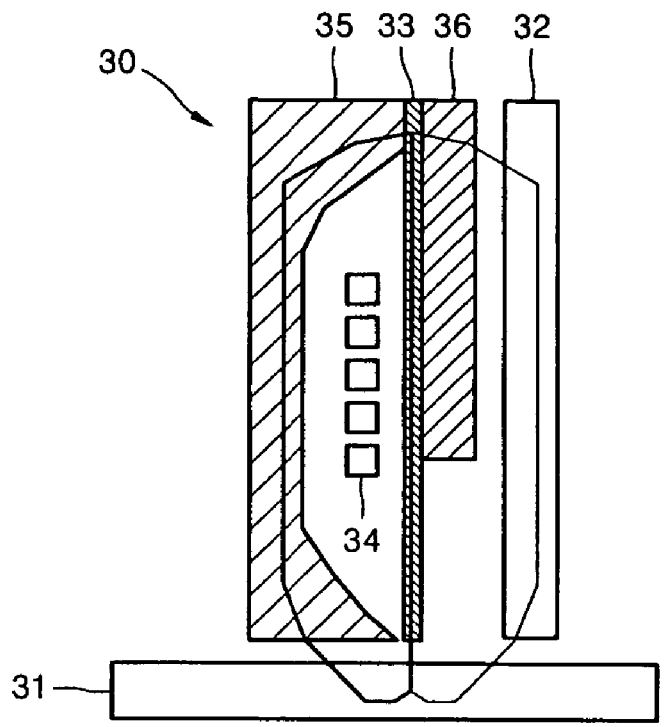
FIG. 3A is a schematic sectional view illustrating the flow of a magnetic field generated inside a conventional magnetic recording head.
Figure 3B:
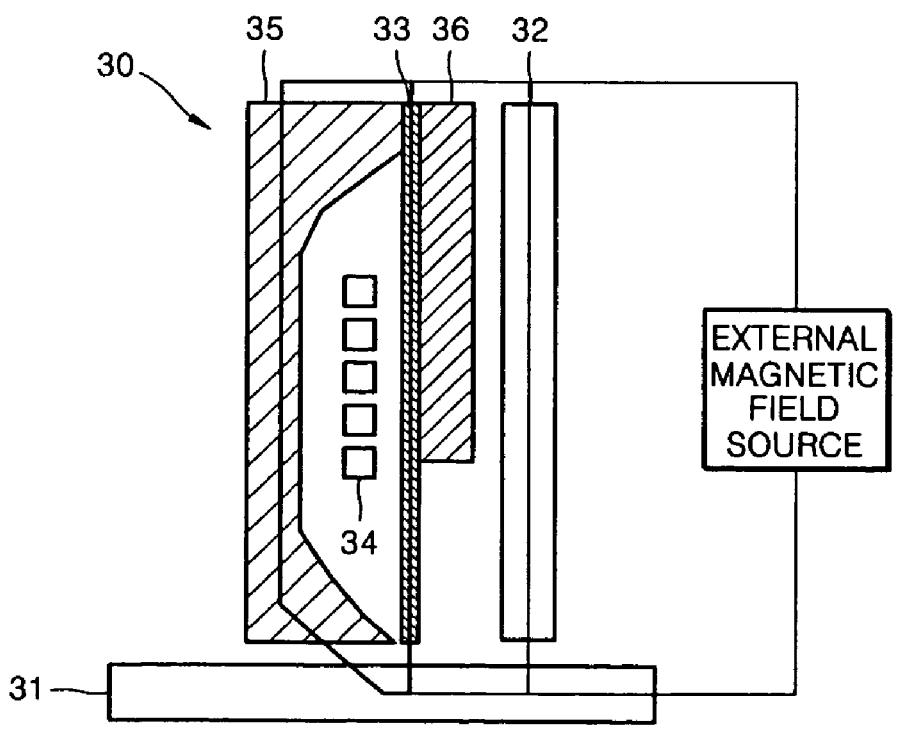
FIG. 3B is a schematic sectional view illustrating the flow of a magnetic field generated by an external magnetic field source outside the conventional magnetic recording head shown in FIG. 3A.
Figure 4A:
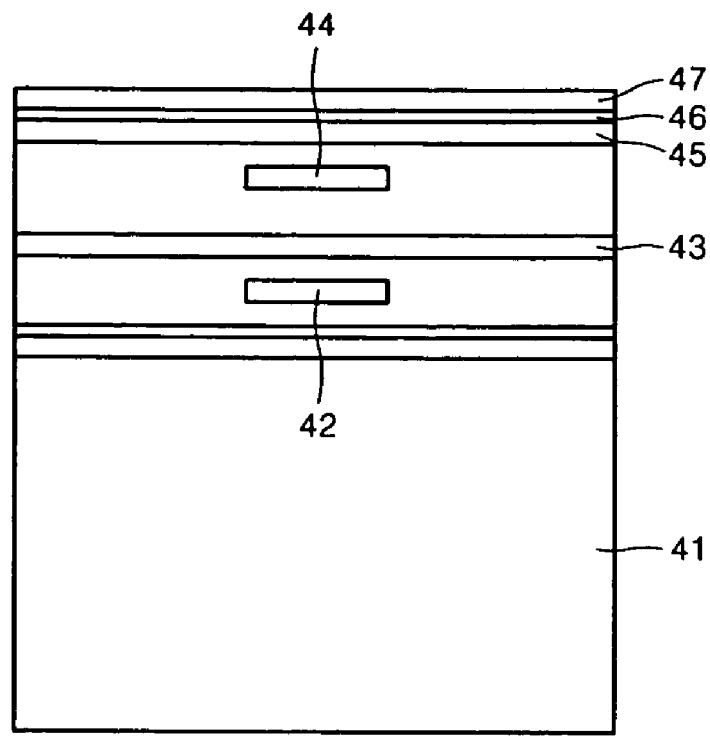
FIG. 4A is a front view of a magnetic recording head according to the present invention.

FIG. 4A is a front view of a magnetic recording head according to the present invention. Referring to FIG. 4A, a multi-layered structure for writing and reading information is formed on a substrate 41. Here, since a magneto-resistive head 42 is simply shown because it has the same structure as a conventional magneto-resistive head. The magneto-resistive head 42 is formed on the substrate 41, and a return pole 43 made of a magnetic material is formed on the magneto-resistive head 42. A writing pole 44 is formed over the return pole 43, and a first shield layer 45 and a second shield layer 47 are formed on the writing pole 44 to be spaced by a predetermined distance from the writing pole 44. An insulation layer 46 is interposed between the first shield layer 45 and the second shield layer 47.

Figure 4B:
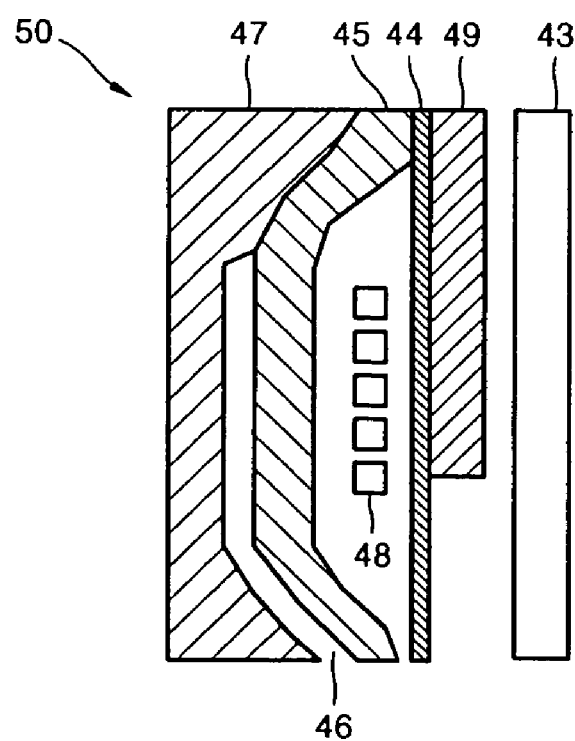
FIG. 4B is a side sectional view of the magnetic recording head shown in FIG. 4A.

FIG. 4B is a side sectional view of the magnetic recording head shown in FIG. 4A. Referring to FIG. 4B, the writing pole 44 is spaced by the predetermined distance from the return pole 43, and the first shield layer 45 and the second shield layer 47 are formed on the writing pole 44. The insulation layer 46 is formed between the first shield layer 45 and the second shield layer 47 to magnetically separate the first shield layer 45 from the second shield layer 47. An induction writing coil 48 for writing information is formed between the writing pole 44 and the first shield layer 45. Here, there are no limitations in the position of the induction writing coil 48, and the induction writing coil 48 may also be formed between the return pole 43 and the writing pole 44. A plating pole 49 may be further formed under the writing pole 44.

FIGS. 4A and 4B illustrate an example where the two shield layers, that is, the first shield layer 45 and the second shield layer 47, are formed on the writing pole 44. However, according to the magnetic recording head of the present invention, shield layers more than two shield layers may be formed on the writing pole 44. Each insulation layer 46 is formed between adjacent shield layers 45 and 47 of the plurality of shield layers. The insulation layer 46 does not extend up to tailing ends of the shield layers 45 and 47, but extends from leading ends of the shield layers 45 and 47, i.e., the substrate 41 to predetermined portions of the tailing ends. That is, the leading ends of the shield layers 45 and 47 are magnetically separated by the insulation layer 46. However, the tailing ends of the shield layers 45 and 47 are magnetically connected, thereby effectively configuring a magnetic circuit where internal and external magnetic fields diverge, not converge. However, the present invention is not limited thereto.

In the present invention, the lower shield layer, that is, the first shield layer 45, is made of a material having a magnetic permeability similar to that of the upper shield layer, that is, the second shield layer 47. However, it is preferable that the magnetic permeability and size of the first shield layer 45 be equal to or less than those of the second shield layer 47. If the lower and upper shield layers 45 and 47 have the same magnetic permeability and size during the operation of the magnetic recording head, densities of internal and external magnetic fields flowing toward the lower shield layer 45 become greater than those flowing toward the upper shield layer 47.

Figure 5A:
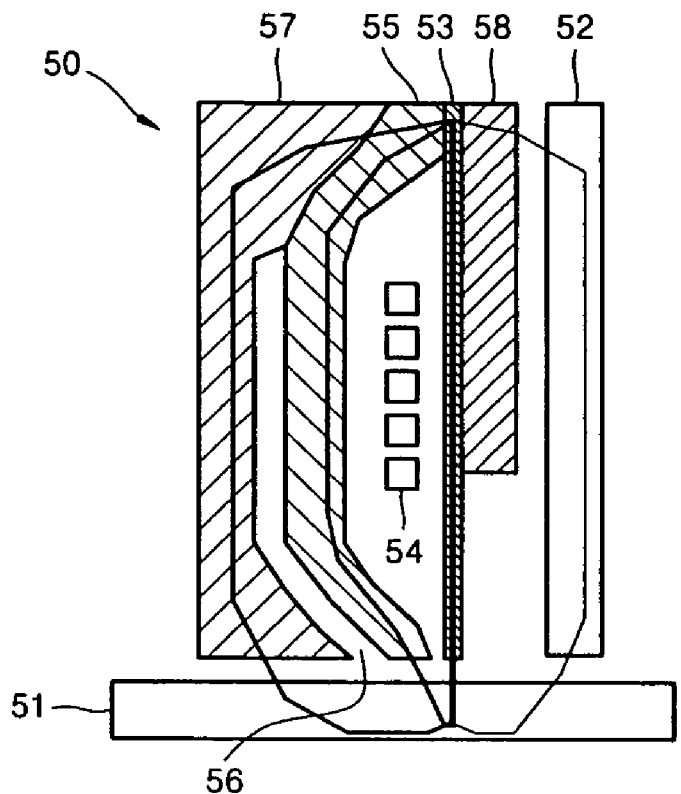
FIG. 5A is a schematic sectional view illustrating the flow of a magnetic field generated inside a magnetic recording head.

FIG. 5A illustrates the flow of a magnetic field when information is written on an information recording media 51 using a magnetic recording head 50 according to the present invention. Since a return pole 52 is not magnetically connected to a writing pole 53, most of magnetic flux from the writing pole 53 flows to a first shield layer 55 and a second shield layer 57. Then, magnetic fields flowing through the shield layers 55 and 57 do not demagnetise a magnetic field generated across the writing pole 53 and do not affect writing of the writing pole 53. Here, if the first shield layer 55 has a magnetic permeability and a width less than those of the second shield layer 57, the magnetic fields flowing through the first shield layer 55 and the second shield layer 57 can be controlled to distribute similarly.

Figure 5B:
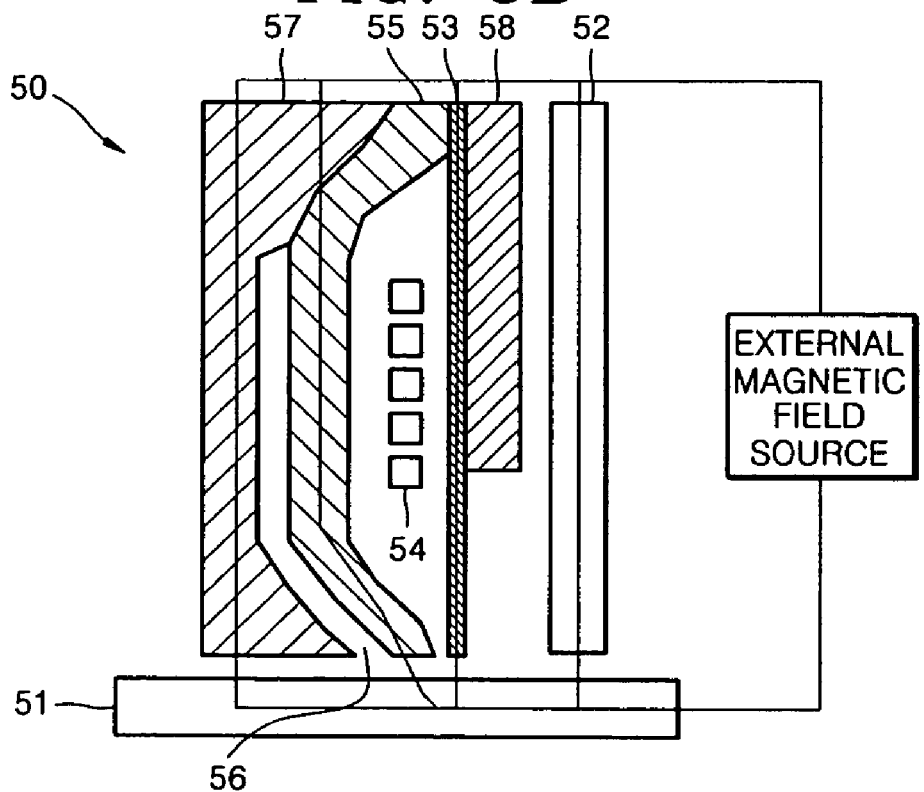
FIG. 5B is a schematic sectional view illustrating the flow of a magnetic field generated by an external magnetic field source outside the magnetic recording head shown in FIG. 5A.

FIG. 5B is the flow of a magnetic field generated by an external magnetic field source outside the magnetic recording head 50 shown in FIG. 5A. As shown in FIG. 5B, the magnetic field generated by the external magnetic field source is expanded through the magnetic recording head 50 to the information recording media 51. That is, the magnetic field flows through the return pole 52, the writing pole 53, the first shield layer 55, and the second shield layer 57 to the information recording media 51. In this way, since two or more shield layers are formed and the external magnetic field that flows to the writing pole 53 is dispersed to the plurality of shield layers, the influence of the external magnetic field on the writing pole 53 can be reduced.

FIGS. 6A through 6D are schematic views illustrating a method of manufacturing a magnetic recording head according to the present invention. The method forms a plurality of shield layers on a typical magnetic recording head, and other operations of the method are not much different from a conventional method of manufacturing a magnetic recording head.

Figure 6A:
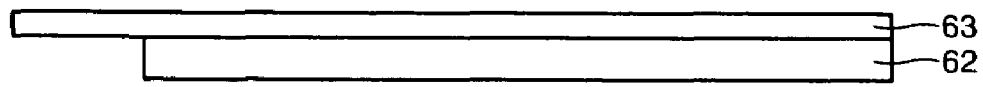
FIGS. 6A through 6D are schematic sectional views illustrating a method of manufacturing a magnetic recording head.
Figure 6B:
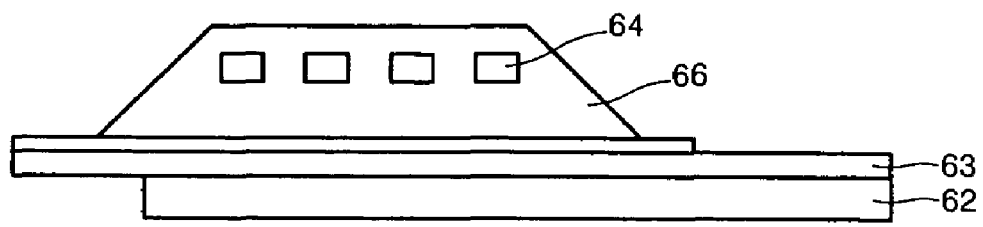
Figure 6C:
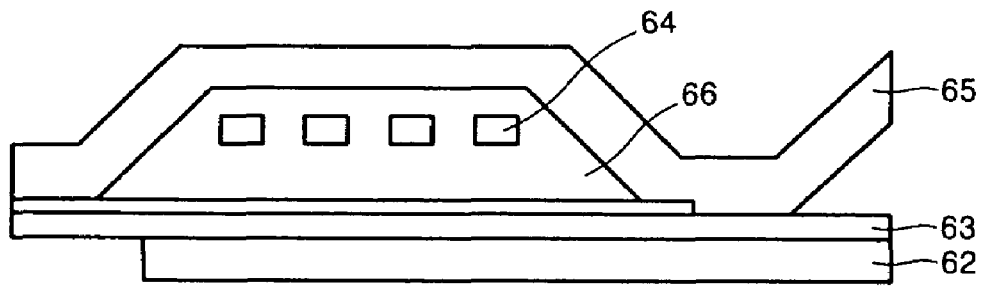
Figure 6D:
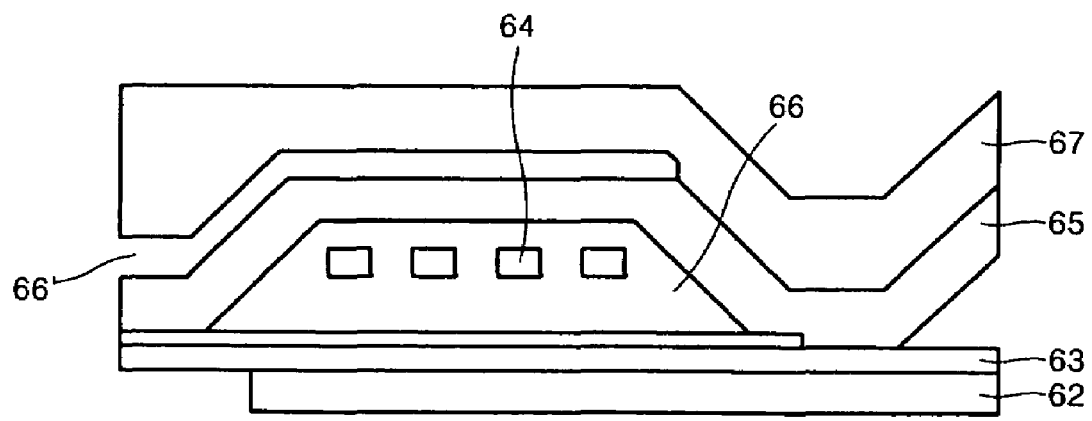

Referring to FIG. 6A, a plating pole 62 and a writing pole 63 are formed. Referring to FIG. 6B, a part of an insulation layer 66 made of an insulating material is formed, a writing coil 64 is installed on the insulation layer 66, and a remaining insulating material is applied to the resultant structure to completely form the insulation layer 66. Referring to FIG. 6C, a magnetic material is deposited through sputtering or the like to form a first shield layer 65. Referring to FIG. 6D, an insulation layer 66' is formed on a predetermined portion of the first shield layer 65, and a second shield layer made of a magnetic material is formed on the resultant structure.

Here, the materials of the insulation layers 66 and 66' are non-magnetic materials, for example, aluminium oxide ($Al_2O_3$) or silicon dioxide ($SiO_2$). The insulation layer 66' formed on the first shield layer 65 does not extend over the entire surface of the first shield layer 65, but extends from a leading end of the first shield layer 65 to a predetermined portion of a tailing end of the first shield layer 65. This is because tailing ends of the first shield layer 65 and the second shield layer 67 contact each other to induce a magnetic field to flow smoothly to the second shield layer 67.

Figure 7:
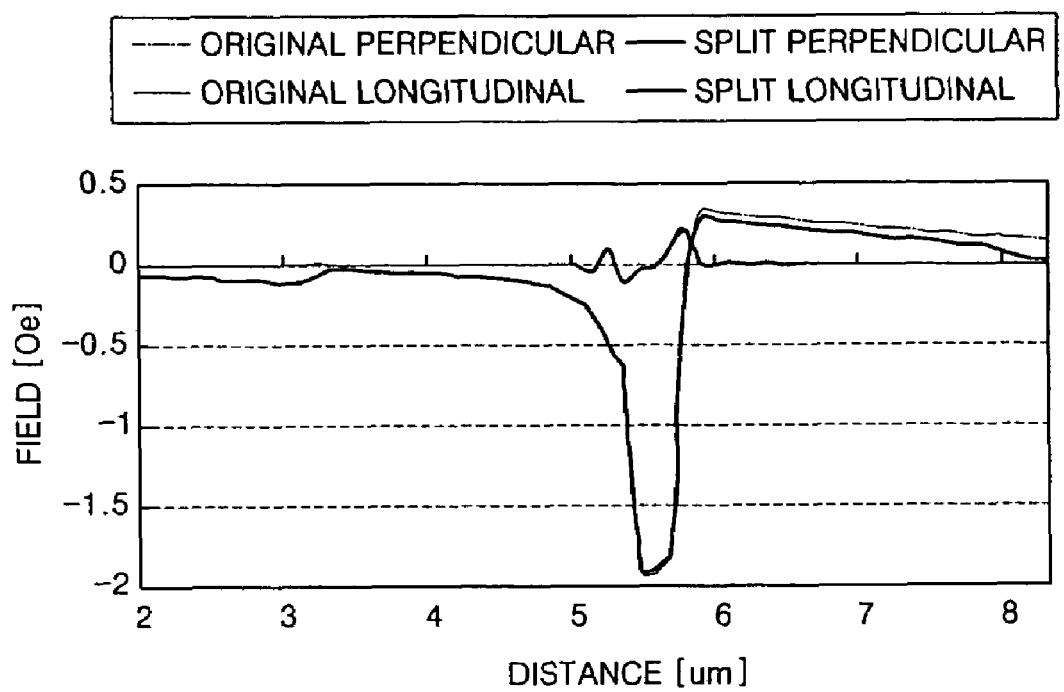
FIG. 7 is a graph illustrating distances versus strengths of magnetic fields generated inside a conventional magnetic recording head and a magnetic recording head according to the present invention.

FIG. 7 is a graph for comparing perpendicular and longitudinal magnetic fields from a conventional perpendicular magnetic recording head and a perpendicular magnetic recording head according to the present invention through electromagnetic field analysis. Here, the horizontal axis of the graph denotes a distance, from a return pole to a shield layer, of a leading end of a magnetic recording head that faces an information recording media. That is, the return pole is formed in an area of 0 to 3 µm of the horizontal axis, a writing pole is formed in an area of 5 to 6 µm, and the shield layer is formed in an area greater than 6 µm. Original head denotes a conventional magnetic recording head, and Split head denotes a magnetic recording head according to the present invention. It can be seen that in the area greater than 6 µm, a perpendicular magnetic field in the magnetic recording head of the present invention decreases more than the conventional magnetic field. That is, since the magnetic recording head according to the present invention includes two or more shield layers formed on the writing pole, the flow of the magnetic field is dispersed and reduced more than the conventional magnetic recording head that includes no shield layer or only one shield layer.

Figure 8:
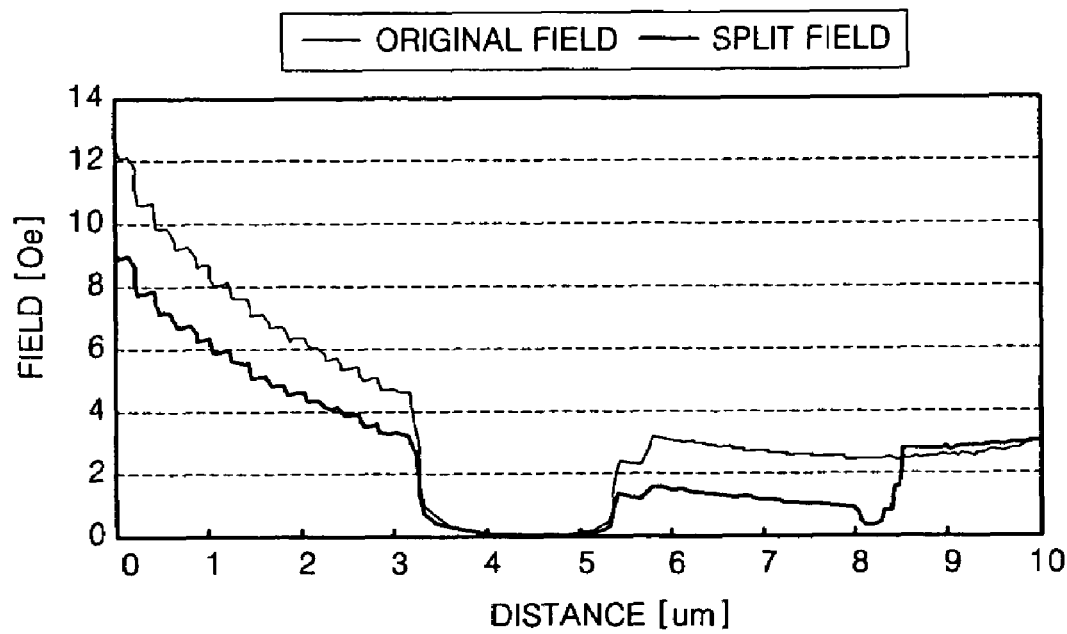
FIG. 8 is a graph illustrating distances versus strengths of external magnetic fields generated outside a conventional magnetic recording head and a magnetic recording head according to the present invention.

FIG. 8 is a graph for comparing a strength of a magnetic field generated by an external magnetic field in a conventional magnetic recording head with a strength of a magnetic field generated by an external magnetic field in a magnetic recording head according to the present invention through electromagnetic field analysis. Here, the graph illustrates a strength versus a distance from the return pole to the shield layer. As shown in FIG. 8, the magnetic recording head where two or more shield layers are formed on the writing pole is less influenced by the external magnetic field than the conventional magnetic recording head over all the return pole area of 0 to 3 µm, the writing pole area of 5 to 6 µm, and the shield layer area greater than 6 µm.

According to the present invention, when the perpendicular magnetic recording is performed using the magnetic fields generated inside and outside the magnetic recording head, the magnetic flux flowing toward the single-layer shield portion is dispersed to effectively reduce a noise of the magnetic recording head caused by the magnetic fields. Further, the externally generated magnetic field is prevented from concentrating on the writing pole and obstructing the writing of information, thereby effectively dispersing the magnetic field that flows to the writing pole.

As a result, information can be effectively recorded on and erased from the information recording media.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A magnetic recording head comprising:
    a return pole formed on a magneto-resistive head;
    a writing pole formed over the return pole;
    an introduction writing coil for inducing a magnetic field to be formed across the writing pole; and
    a plurality of shield layers formed on the writing pole to be spaced by a predetermined distance from the writing pole.

2. A magnetic recording head comprising:
    a return pole;
    a writing pole spaced by a predetermined distance from the return pole;
    an introduction writing coil for inducing a magnetic field to be formed across the writing pole;
    a plurality of shield layers formed on the writing pole; and
    at least one insulation layer,
    wherein the plurality of shield layers are made of a magnetic material, and a respective one of said at least one insulation layer is formed between adjacent shield layers of the plurality of shield layers to separate the adjacent shield layers,
    wherein among the plurality of shield layers, a magnetic permeability of a lower shield layer is less than a magnetic permeability of an upper shield layer.

3. The magnetic recording head of claim 2, wherein the respective one of said at least one insulation layer formed between the adjacent shield layers extends from leading ends of the adjacent shield layers to predetermined portions of tailing ends of the adjacent shield layers.

4. The magnetic recording head of claim 2, wherein among the plurality of shield layers, a width of a leading end of a lower shield layer is less than or equal to a width of a leading end of an upper shield layer.

5. The magnetic recording head of claim 2, wherein leading ends of the plurality of shield layers are aligned with a leading end of the writing pole.

* * * * *